United States Patent [19]
Leibach et al.

[11] 3,893,626
[45] July 8, 1975

[54] THRUST REVERSING APPARATUS FOR TURBOJET ENGINES

[75] Inventors: Heinrich Leibach, Grafrath-Wildenroth; Hans Zinner, Dachau, both of Germany

[73] Assignee: Motoren-und Turbinen-Union Munchen GmbH, Germany

[22] Filed: Oct. 25, 1973

[21] Appl. No.: 409,430

[30] Foreign Application Priority Data
Oct. 25, 1972 Germany............................ 2252208

[52] U.S. Cl................................ 239/265.19; 60/230
[51] Int. Cl................................................ B64c 15/06
[58] Field of Search..... 239/265.19, 265.25, 265.27, 239/265.29, 265.31; 181/33 HD; 60/228, 230, 226 A

[56] References Cited
UNITED STATES PATENTS

| | | | |
|---|---|---|---|
| 2,812,980 | 11/1957 | Kadosh et al. | 60/230 X |
| 2,879,014 | 3/1959 | Smith et al. | 60/230 X |
| 3,018,620 | 1/1962 | Meyer | 239/265.19 |
| 3,442,471 | 5/1969 | Fischer et al. | 239/265.19 X |
| 3,640,468 | 2/1972 | Searle et al. | 239/265.29 |
| 3,655,150 | 4/1972 | Haberkorn et al. | 239/265.35 X |

*Primary Examiner*—Robert S. Ward, Jr.
*Attorney, Agent, or Firm*—Craig & Antonelli

[57] ABSTRACT

Thrust reversing apparatus for turbojet powered aircraft including jet deflector flaps which are operably pivoted into and out of the jet stream. Baffle plates are provided on the deflecting flaps for inducing asymmetric deflection of the thrust gases so as to prevent re-ingestion of the thrust gases by the engine compressors, as well as to minimize adverse ground errosion effects during thrust reversing operations. By providing the baffles directly on the flaps for inducing the asymmetric flow, the flaps themselves can be arranged symmetrically and pivoted symmetrically into and out of position in the jet stream. Preferred embodiments include baffle plates at the deflector flaps which are mounted for pivotal movement into and out of respective operating positions in response to movement of the flaps into and out of operating positions.

26 Claims, 7 Drawing Figures

INNER WALL CONTOUR
OF FLAPS 13(13')

THRUST REVERSING APPARATUS FOR TURBOJET ENGINES

BACKGROUND AND SUMMARY OF THE INVENTION

This invention relates to thrust reversing means for turbojet-powered aircraft having jet deflector flaps which are operably pivoted into the gas jet.

A thrust reversing means for turbojet engines where the thrust jets which are directed laterally and forward to produce aircraft braking moment are deflected asymmetrically for maximum protection against re-ingestion of thrust portions by the engine compressor has already been disclosed by U.S. Pat. No. 3,640,468. Re-ingestion has been known to cause compressor stall which may ultimately destroy the jet engine. In the thrust reversing means of U.S. Pat. No. 3,640,468 the jet deflector flaps for thrust reversal are pivoted into an asymmetric end position. This asymmetric pivoting of the jet deflector flaps requires power transmission suited for this special function and, coupled therewith, links of various length. The great number of transmissions, levers and links required makes this thrust reversing means a relatively complex technical solution which can be implemented only at a relatively great manufacturing effort.

A broad object of this invention is to eliminate the disadvantages in the said known solution and to provide a thrust reversing means for directly and simply achieving asymmetric reverse thrust jets when in its operating position for maximally eliminating, among others, the hazard of re-ingestion of reverse thrust jet portions by the engine compressor or compressors.

In a further aspect of this invention the thrust reversing means are disposed to minimize the risk of ground erosion and its consequences which may result when the landing approach is flown with the thrust reverser in action.

In one preferred embodiment of this invention the thrust reversing means is especially configured for jet engines which are arranged in pairs in the aircraft tail.

It is particularly contemplated by the present invention to provide a thrust reversing means of the above-discussed general type which has baffles on the inner sides of the jet deflector flaps for inducing asymmetric jet deflection. An essential advantage provided by this arrangement is that the jet deflector flaps - relative to the respective longitudinal centerline of the engine - are not only arranged symmetrically but can also be pivoted symmetrically into the gas stream which it is intended to deflect and which flows in a direction parallel with the longitudinal centerline of the engine while still permitting asymmetric reverse thrust jets to be achieved. This symmetric arrangement and operation of the deflector flaps affords an advantage over the above-discussed solution of U.S. Pat. No. 3,640,468 in that it considerably reduces the complexity of the actuating system.

The present invention further contemplates providing at least one pivotally deployable baffle for further enhancing the intended asymmetry of the reverse thrust jets and for enabling the jet deflector flaps to be folded when in the inactive position at a minimum distance radially from the engine centerline so as to keep the fuselage or nacelle tail slim and aerodynamically streamlined.

In a preferred embodiment of this invention the pivotally deployable baffle is pivotally actuated by a link operated by the main levers of the jet deflector flaps so that movement of the jet deflector flaps to thrust reversing positions automatically effects a pivotal actuation of the pivotally deployable baffle.

The present invention further contemplates providing the jet deflector flaps with an asymmetric trailing edge.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 6 is a lateral schematic view which illustrates one preferred embodiment of the interrelationship between the deflector flap movement and movement of a pivotal baffle plate such as depicted in FIG. 4.

DETAILED DESCRIPTION OF THE DRAWINGS

Figure 1:
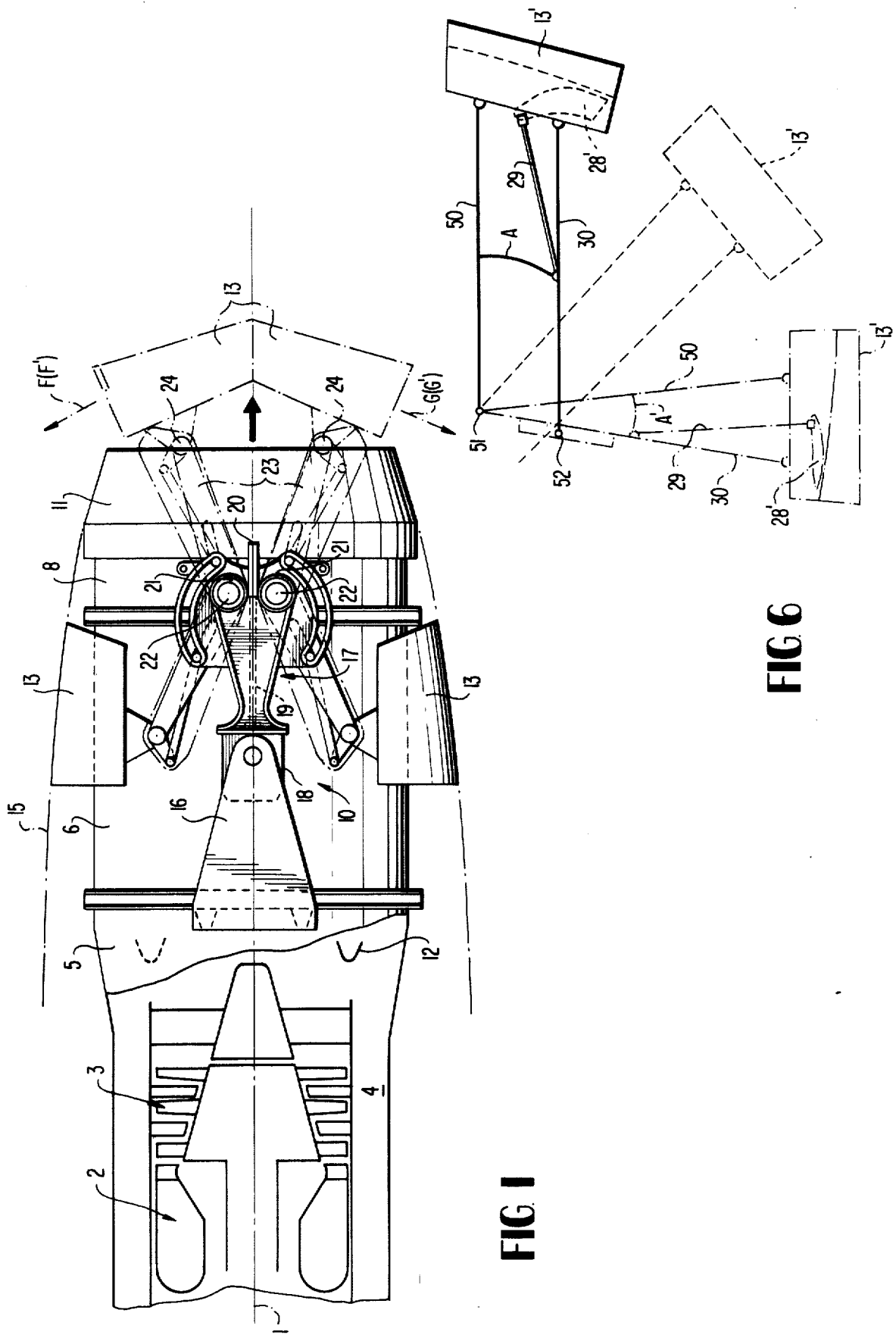
FIG. 1 is a part cross-sectional schematic side view of a turbojet engine with a jet exhaust control arrangement constructed in accordance with a preferred embodiment of the present invention.

FIG. 1 shows a turbojet engine with part thereof broken away for clarity and illustrates — arranged coaxially with the longitudinal centerline 1 of the engine — a combustion chamber system 2 and behind it a multi-stage turbine 3. Not shown on the drawings is a front fan or compressor of the engine which discharges compressed air into an annular duct 4 arranged coaxially with the longitudinal centerline 1 of the engine as a bypass airstream. The hot gas stream issuing from the turbine 3 is enveloped by the bypass air stream from duct 4. Both streams enter a jet pipe 10 which here consists of pipe sections 5, 6 and 8. The pipe section 8 carries at its end a variable nozzle 11 the gas exhaust area of which can be widened when the afterburner is brought into action. A flame holder associated with the afterburning device is generally indicated by the numeral 12.

The jet deflector flaps of the thrust reversing means of FIG. 1 are generally indicated by the numeral 13 and can be deployed from the engine fairing 15 (FIG. 1) for producing the intended reverse thrust when in a position here exemplified by broken line.

The means needed in conjunction with the thrust deflecting means for folding and deploying the jet deflector flaps 13 are described as follows: (For a further detailed description of practical arrangements for facilitating folding and deploying of the jet deflector flaps 13, see the commonly assigned copending applications titled "APPARATUS FOR THRUST REVERSAL," filed Aug. 27, 1973, now U.S. Pat. 3,856,239 and "TURBOJET ENGINES WITH PIVOTING JET PIPE AND THRUST REVERSING MEANS," filed Oct. 3, 1973, now U.S. Pat. No. 3,837,578 the subject matter of said copending applications being incorporated herein by reference to the extent necessary for a complete understanding of the present invention).

Fixedly arranged on the pipe section 5 to either side of the jet pipe 10 is a mounting pad 16 which carries a bracket 17 (the drawings illustrate one set of pad 16 and bracket 17, the other being diametrically opposite thereto). Each bracket 17 contains a hydraulically or pneumatically operated control piston which slides axially in a cylinder 18 and the piston rod 19 of which terminates in a rack 20 which engages with circumferential teeth on the hubs 21 of main levers 23 pivoting about cross axes 22.

The jet deflector flaps 13 are pivotally supported at the points 24 of the main levers 23.

Extension or retraction of the rack 20 operated by the control piston causes the jet deflector flaps to be folded into, or to be deployed from, the engine fairing 15 or the aircraft tail.

Figure 2:
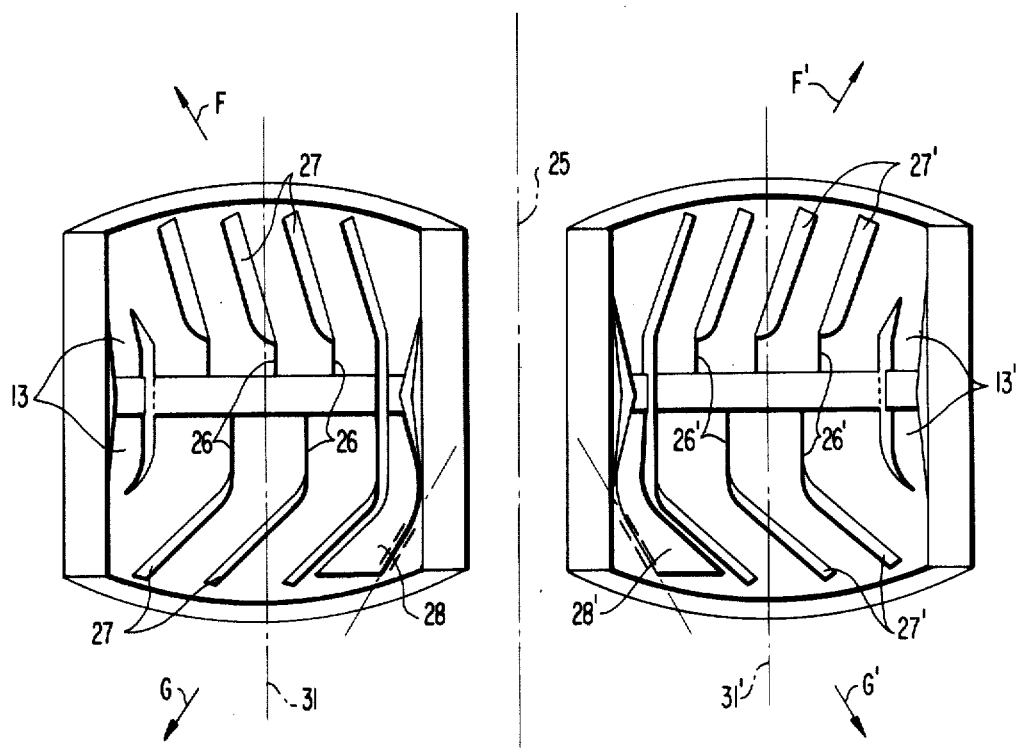
FIG. 2 is a schematic view, taken in the direction of jet exhaust from the engines, of two adjacent pairs of jet deflector flaps constructed in accordance with a preferred embodiment of the present invention and in thrust reversing operating positions for a side-by-side arrangement of two jet engines in an aircraft tail.

FIG. 2 illustrates a preferred embodiment of deflector flaps constructed in accordance with the present invention for use with two jet engines arranged in parallel side-by-side in the tail of an aircraft. One feature of this arrangement is that with the jet deflector flaps 13 and 13' pivoted into the respective thrust jets of the two engines of the reversed thrust jets do not affect each other in the general vicinity of the longitudinal centerline 25 of the aircraft such that a substantial portion of the resulting reverse thrust from the two jet engines is again lost. A further feature is that the reversal thrust jets are directed, notwithstanding the intended braking action, such that the risk of re-ingestion, reverse thrust portions by the engine compressors is prevented. A further feature of this arrangement is that the reversed thrust jets are deflected so as to cause as little ground corrosion as possible and such that the zones of turbulence caused on the runway by portions of the thrust jet during approach or after-landing roll are maximally far away from the respective engine intakes.

Figure 5:
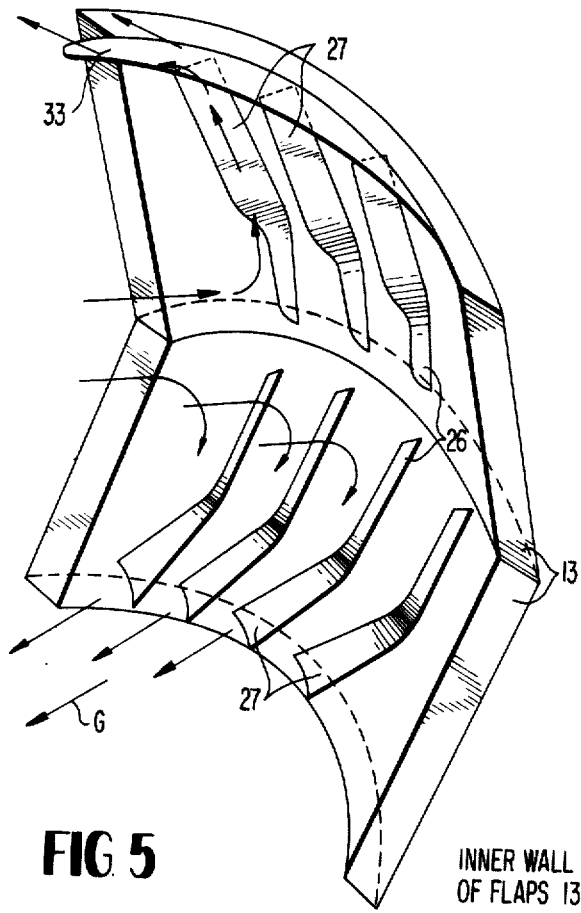
FIG. 5 is an oblique perspective schematic view of one of the pairs of deflector flaps of FIG. 2 which illustrates the flow of thrust reversing gases as well as the trailing edge of FIG. 3.

Referring now to FIGS. 1, 2 and 5, baffles 26 and 26' are arranged on the respective inner sides of the jet deflector flaps 13 and 13' such that during thrust reversal the jet flow is deflected simultaneously forward and laterally outward and away from the longitudinal centerline 25 of the aircraft as shown by flow directions F, F' and G, G'.

For intensifying the deflecting action, the baffles 26, 26' are fitted with collars 27, 27' which have been bent to run approximately parallel with the contour of the inner wall of the deflector flaps 13, 13'.

Figure 4:
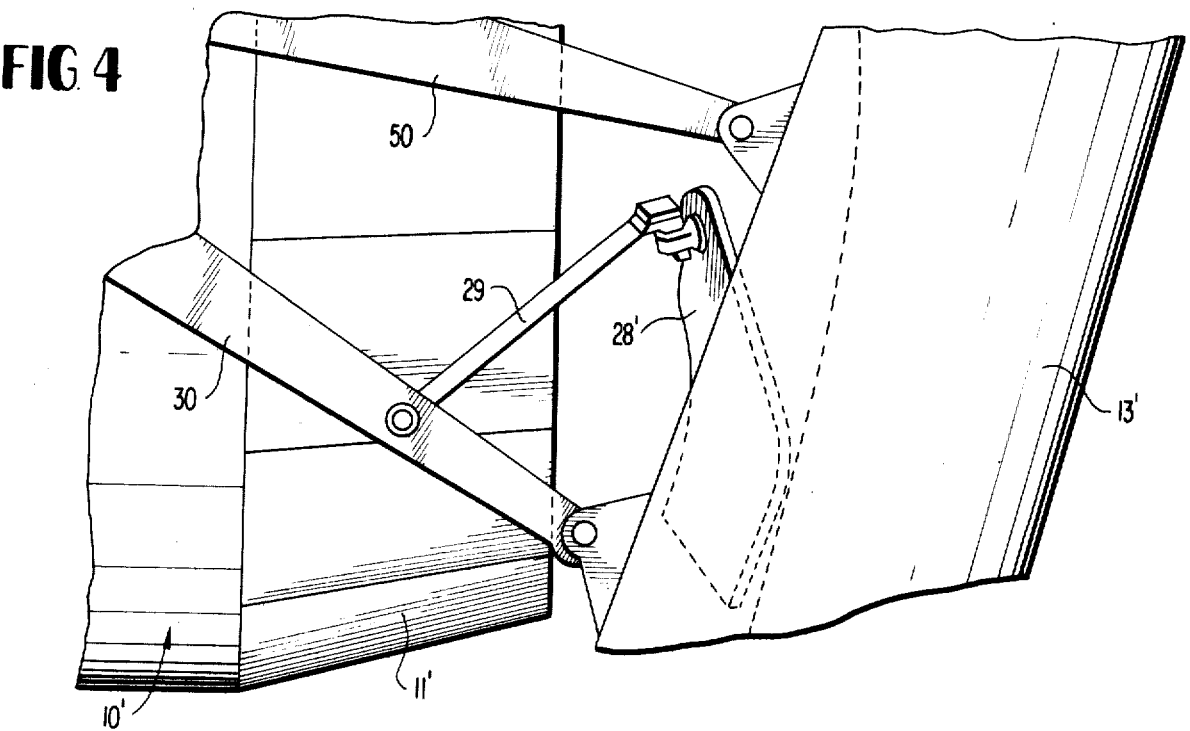
FIG. 4 is a lateral schematic view illustrating the end of a jet pipe, with part of it broken away for clarity, having a thrust nozzle together with an operably deployed thrust deflector flap with means for adjusting a baffle inside said thrust deflector flap in accordance with the preferred embodiment of the present invention of FIG. 2.

As best shown in FIGS. 2, 4 and 6, in addition to baffles 26, 26', the lower flaps 13, 13' are provided with pivotally adjustable baffles 28, 28' in the vicinity of the longitudinal center plane 25 of the aircraft for maximally intercepting the gas masses to be deflected in directions G, G'. These pivotally adjustable baffles 28, 28' provide an essential advantage also in that they will, when the jet deflector flaps 13, 13' are folded in the engine or fuselage fairing 15, not project beyond the inner contour of the flaps, so that the jet deflector flaps 13, 13' may be folded extremely close to the adjacent jet pipe 10. That is, since baffles 28, 28' are pivotally foldable, they can be constructed considerably larger than baffles 26, 26' for optimizing deflection at the important area adjacent the center plane 25 while still permitting storage of the flaps 13, 13' as close to the jet pipe 10 as the baffles 26, 26' will permit.

As best illustrated in FIGS. 4 and 6, the pivotally adjustable baffle 28' is deployed by means of a link 29 hinged to a lever 30 which moves during pivotal positioning of a jet deflector flap 13'. Main lever 50 (FIG. 6, corresponding also to main lever 23 of FIG. 1) is pivotal about fixed point 51 (corresponding axes 22 of FIG. 1 embodiment) for moving flap 13 between operative and inoperative positions. Guide lever 30 is mounted for sliding movement along a fixed bearing point 52. If the flap 13' is now moved from the operating position (shown in full line) to the inoperative position (shown in dash and dot line), the distance A between levers 50 and 30 changes necesarily to the distance A' such that guide link 29 is displaced further into the interior of the flap 13' with a consequent retraction of the baffle 28' in the direction toward the inner wall contour of the flap 13'.

Figure 3:
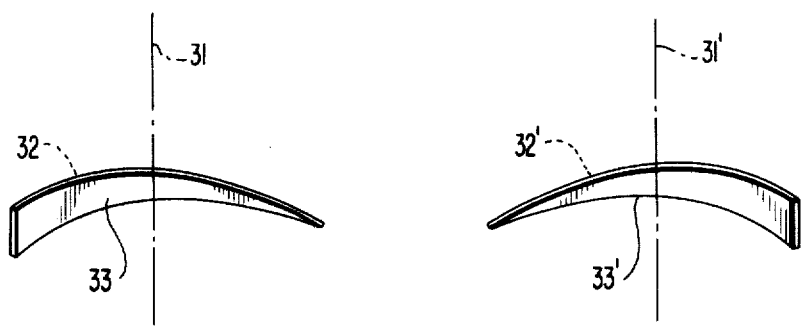
FIG. 3 is a partial top sechematic view of the trailing edges associated with the deflector flaps of FIG. 2.

The flow of gas in directions F, F' (FIGS. 1, 2 and 5) during thrust reversal is further enhanced by providing the upper rims of the jet deflector flaps 13, 13' with eccentric (relative to the respective longitudinal center planes 31, 31' of the engine and relative to the upper contours 32, 32' of the inner walls) trailing edges 33, 33' (FIGS. 3 and 5).

Figure 7:
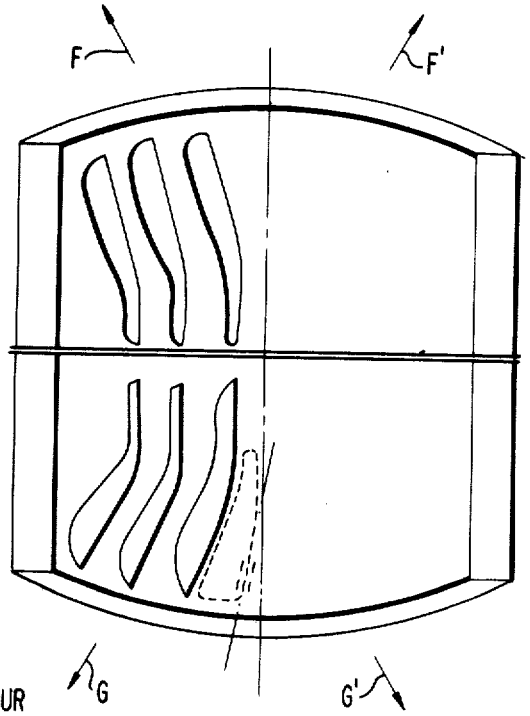
FIG. 7 is a schematic view, taken in the direction of jet exhaust from the engine, of a single pair of jet deflector flaps constructed in accordance with another preferred embodiment of the present invention and in thrust reversing operating positions for a single jet engine.

FIG. 7 illustrates a preferred embodiment of the invention for a single jet engine arranged in the aircraft tail or in a nacelle. In this embodiment the pair of flaps of a thrust reversing means associated with the jet engine is configured such that the upper and the lower jet deflector flaps produce simultaneously forward and laterally outward directions of jet according to flow directions F, F', G, G'. (FIG. 7 illustrating baffles for only the lefthand half of the flaps, it being understood that the righthand half is a mirror image thereof). The solid line baffle illustration in FIG. 7 relates to baffles similar to baffles 26, 26' and the dash line illustration relates to a baffle similar to baffles 28, 28'.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A jet exhaust control arrangement for controlling exhausting of gases supplied by at least one engine; said arrangement comprising:

jet pipe means for discharging gases from said at least one engine as thrust gases,
   thrust reversing deflecting flap means which are movable between inoperative positions out of the path of said thrust gases and operative positions in deflecting engagement with said thrust gases for accommodating reversal of the thrust forces resulting from said thrust gases,
   and baffle means disposed on said deflecting flap means for inducing asymmetric deflection of said thrust gases.

2. An arrangement according to claim 1, wherein said deflecting flap means includes a pair of flap members movable symmetrically toward their respective operating positions with respect to a thrust gas centerline which extends along the direction of flow of said thrust gases from said jet pipe means.

3. An arrangement according to claim 1, wherein said jet pipe means includes a pair of jet pipes spaced from one another and discharging said thrust gases in respective jet streams extending substantially parallel to one another, and wherein said deflecting flap means includes a pair of flap members for each of said jet pipes, the flap members of a given pair being movable symmetrically toward their respective operating positions with respect to respective thrust gas centerlines extending along the respective jet streams.

4. An arrangement according to claim 3, wherein two separate jet engines are provided, one of said jet pipes discharging gases from one of said engines and the other jet pipe discharging gases from the other of said engines.

5. An arrangement according to claim 3, wherein said baffle means are configured so as to induce asymmetric deflection of said thrust gases in a direction away from a plane of symmetry extending between said jet pipes.

6. An arrangement according to claim 1, wherein said baffle means includes at least one baffle plate which is mounted at said flap means for pivotal movement between inoperative and operative positions of said at least one baffle plate.

7. An arrangement according to claim 6, wherein said at least one baffle plate is pivotally positioned by means of a link operated by main levers of the flap means such that movement of said flap means from the inoperative to operative positions thereof automatically effects a pivotal movement of said at least one baffle plate from the inoperative and operative positions thereof.

8. An arrangement according to claim 1, wherein said deflecting flap means are provided with asymmetric trailing edge means.

9. An arrangement according to claim 2, wherein said deflecting flap means are provided with asymmetric trailing edge means.

10. An arrangement according to claim 6, wherein said deflecting flap means are provided with asymmetric trailing edge means.

11. An arrangement according to claim 7, wherein said deflecting flap means are provided with asymmetric trailing edge means.

12. An arrangement according to claim 1, wherein a plurality of said baffle means are disposed on each of said deflecting flap means, which baffle means are configured to simultaneously deflect said thrust gases forwardly and laterally outward away from a longitudinal centerline of said engine.

13. An arrangement according to claim 12, wherein said baffle means includes at least one baffle plate which is mounted at said flap means for pivotal movement between inoperative and operative positions of said at least one baffle plate.

14. An arrangement according to claim 1, wherein said baffle means are disposed on an inner wall of each of said deflecting flap means, each of said baffle means including a collar portion which extends approximately parallel with the contour of a corresponding deflector flap means inner wall.

15. An arrangement according to claim 1, wherein a plurality of said baffle means are disposed on each of said deflecting flap means in side-by-side relationship, and wherein said baffle means extend generally radially with respect to the direction of flow of said thrust gases when said deflecting flap means are in said operative positions.

16. An arrangement according to claim 12, wherein a plurality of baffle means are disposed on each of said deflecting flap means, said baffle means having outer portions which are bent laterally with respect to the remaining portions of said baffle means.

17. An arrangement according to claim 7, wherein said deflecting flap means includes a plurality of baffle plates fixed in position on said deflecting flap means.

18. An arrangement according to claim 17, wherein said rigid baffle plates each include collar portions which extend approximately parallel with the contour of wall portions of said flap means which force the flow of exhaust gases from said jet pipe means.

19. An arrangement according to claim 18, wherein said deflecting flap means are provided with asymmetric trailing edge means.

20. An arrangement according to claim 4, wherein the lower flap member of each pair includes a pivotal baffle plate which is mounted for pivotal movement with respect to said flap member and a plurality of fixed baffle plates.

21. An arrangement according to claim 20, wherein said pivotal baffle plates are located at the side of the respective flap member closest to the jet stream of the other jet pipe.

22. An arrangement according to claim 1, wherein each of said at least one engines is a turbojet engine.

23. A jet exhaust control arrangement for controlling exhausting of gases supplied by at least one engine of an aircraft; said arrangement comprising:

jet pipe means for discharging gases from said at least one engine as thrust gases,
   thrust reversing deflecting flap means which are movable along a plane parallel to a longitudinal centerplane of said aircraft between inoperative positions out of the path of said thrust gases and operative positions in deflecting engagement with said thrust gases for accommodating reversal of the thrust forces resulting from said thrust gases, and
   baffle means for inducing asymmetric deflection of said thrust gases disposed on said deflecting flap means in side-by-side relationship and extending generally radially with respect to a thrust gas centerline which extends along the direction of flow of said thrust gases from said jet pipe means, wherein radially outward portions of said baffle means extend laterally and outwardly with respect to a longitudinal centerplane of said aircraft to induce said asymmetrical deflection of said thrust gases.

24. An arrangement according to claim 23, wherein said baffle means each include a collar portion which extends approximately parallel with the contour of wall portions of said flap means which force the flow of exhaust gases from said jet pipe means.

25. An arrangement according to claim 14, wherein said collar portion is spaced from said deflector flap means inner wall.

26. An arrangement according to claim 24, wherein said collar portion is spaced from a corresponding flap means wall portion.

* * * * *